(No Model.) 2 Sheets—Sheet 1.
J. ASKINS.
APPARATUS FOR THE MANUFACTURE OF GAS.
No. 491,398. Patented Feb. 7, 1893.
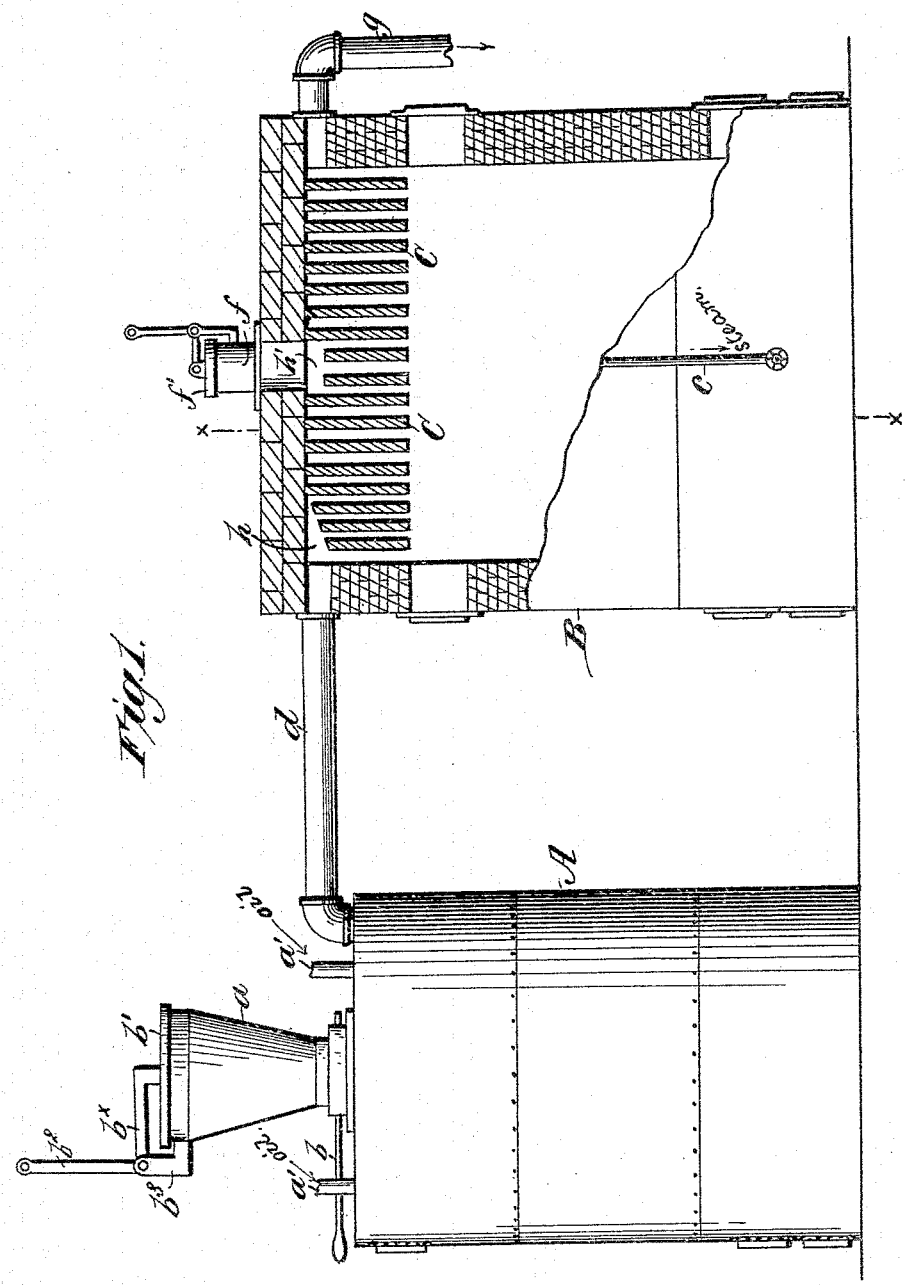
Witnesses.
Robert Emmett
J. A. Rutherford
Inventor:
Joseph Askins.
By James L. Norris
Atty.

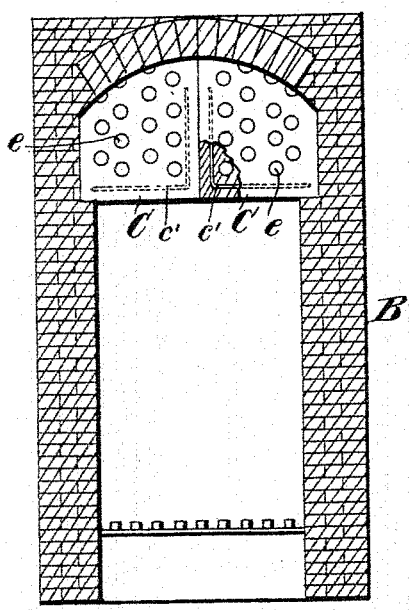
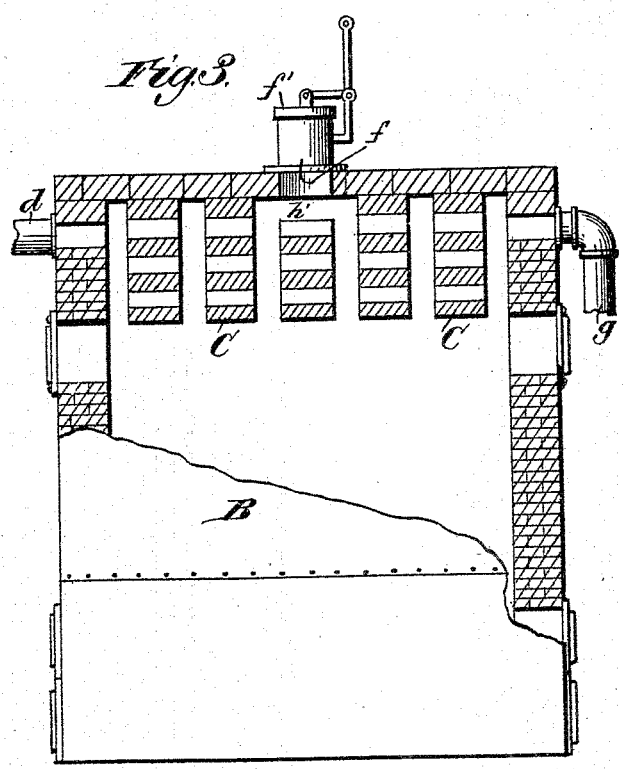
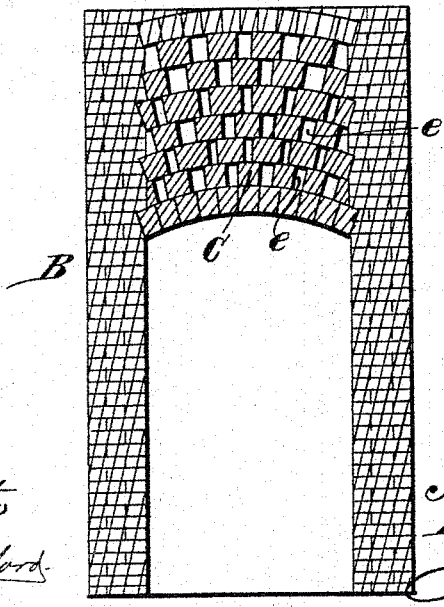

UNITED STATES PATENT OFFICE.

JOSEPH ASKINS, OF LIMA, OHIO.

APPARATUS FOR THE MANUFACTURE OF GAS.

SPECIFICATION forming part of Letters Patent No. 491,398, dated February 7, 1893.

Application filed May 11, 1892. Serial No. 432,585. (No model.)

*To all whom it may concern:*

Be it known that I, JOSEPH ASKINS, a citizen of the United States, residing at Lima, in the county of Allen and State of Ohio, have invented new and useful Improvements in Apparatus for the Manufacture of Water-Gas, of which the following is a specification.

My invention relates to an improved apparatus for the manufacture of gas, and it has for its object to provide for the expeditious and economical production of carbureted water gas as hereinafter set forth.

The invention consists in the combination and arrangement of the several parts of a gas-making apparatus comprising a furnace or generator for the production of hydrocarbon vapors and gases, a water gas generator connected with the hydrocarbon vapor generator and receiving the hot gases and vapors therefrom and a body of perforated tiles or checker-brick-work supported in the upper part of the water gas generator and forming therein a perforated fixing surface through which the vapors and gases from the hydro carbon vapor generator are passed horizontally and thus brought into contact with the ascending currents of water gas whereby the mixture of gases is fixed by contact with the heated surfaces of said tiles or checker-brick-work and thence conducted to a scrubber or to a suitable gas receiver.

The invention also consists in the peculiar features of construction and novel combination of parts in a gas making apparatus as hereinafter described and claimed.

In the accompanying drawings forming part of this specification—Figure 1 is a broken sectional, and side, elevation of my improved gas making apparatus or plant, and Fig. 2, is a sectional elevation of the same, taken on the line $x$—$x$ of Fig. 1. Figs. 3 and 4 are sectional views, taken at right angles to each other, of a modified form of my invention.

In the organization of my invention, I provide a suitable generator or furnace A having a charging hopper $a$, at its top or upper end; and covering an opening in the bottom of said hopper, communicating with the chamber of said furnace or generator, is a hand-actuated slide or valve $b$ to provide for the feeding or dumping into said chamber of the contents of said hopper, which is supplied with soft, or bituminous coal. The oil is preferably fed or passed into the furnace through several pipes $a'$ at the same time. The hopper $a$ is also provided with a cover or cap $b'$ to the center of which is fixed the lower end of the right-angled fixed arm $b^\times$ of a hand-lever $b^2$, pivoted at its lower end to a bracket $b^3$ projecting from said hopper. The hopper with its cap or cover closed is thus adapted by withdrawing the slide-valve, to permit of the feeding of its contents or coal into the furnace and yet prevent the escape thereat of gaseous vapors from the furnace.

B is a water gas generator arranged contiguous to the hydrocarbon vapor generator or furnace A and having a suitable grate, upon which is built a coke-fire to which steam is admitted by a pipe $c$ connecting with a steam generator or boiler and said converter. This water gas generator B converter or fixing chamber has suitable connection by a pipe $d$ with the furnace A at its top, and in said water gas generator are arranged, across the upper part of its chamber, tiers of tiles C, say about three inches thick, built into the walls of said generator and spaced-apart at intervals say about three inches, opposite individual tiles or tile-sections meeting centrally of said chamber as shown, and through and between these tiles the gases from the generator A pass horizontally to the delivery end of the water gas generator while the water gas and hydrocarbon vapors become commingled and fixed by exposure to the intense heat of the upper part of the chamber B in which said tiles are arranged. These tiles or tile-sections are also provided or formed with perforations $e$ throughout, to permit the passage therethrough of the commingled gaseous vapors from the furnace and the hydrogen gas &c., entering the spaces or passages between said tiles or tile-sections, whereby the gas is caused to pass over a greatly extended heating surface, while the tiles or heating surfaces themselves, by thus causing the heat to pass through the honey-comb-like surface into which the tiles or tile-sections are thus converted, are quickly and thoroughly heated.

To permit the wholly unobstructed passage or entrance of the gaseous vapors from the generator or furnace through the pipe $d$, into the gas generator, the tiles C are reduced or cut away as at $h$ just opposite the delivery end of said generator. The tile-sections just opposite the outlet $f$ are also likewise reduced or cut away as at $h'$ for the unobstructed escape of the gas at that point during, as above stated, the initial heating of the converter.

In the top of the water gas generator B is an outlet $f$ having a handled cover $f'$ to provide for the escape, at the initial stage of the operation, or while heating up the converter, of the gas, said cover after this being closed. For the outlet of the fixed gas, a pipe $g$ is provided, leading to the scrubber (not shown) or directly to the main to which the gas at this stage is conducted as usual.

The operation will readily be understood from what has already been stated, it only being necessary for the attendant to properly attend to the charging of the furnace A with the coal and oil or hydrocarbons, and to regulate the heating up of the generator B.

In the modification as disclosed in Figs. 3 and 4, I may use instead of the perforated spaced-apart tiles, checker-brick-work as shown.

By employing the tiles in the manner described it is possible to dispense with the blast apparatus usually required in generators, and further the tiles or checker work can be heated in considerably less time than usual as it is in close contact with the fire and each side of the tiles is exposed to the heat, thereby effecting a saving of fuel.

The tiles are each preferably provided with a small metal rod $c'$ which is embedded therein to prevent the tile, from falling to pieces if it should crack.

In operating this gas making apparatus the drafts of the water gas generator B are opened while the said generator and the tiles C in its upper part are being heated, after which the cover $f'$ is shut down. When the coke fuel in the generator B has become incandescent steam will be admitted to the generator through the pipe $c$. The fire in the hydrocarbon vapor generator A is produced by the combustion of coal introduced through the charging hopper $a$. The hydrocarbon oil fed into the furnace A through the pipes $a'$ becomes vaporized by the heat of the furnace and is mingled with the coal gas and volatile products of combustion. From this furnace or generator A the mingled hydrocarbon vapors and gases pass through the pipe $d$ into the upper part of the water gas generator B in contact with the intensely heated tiles or brick checker-work C through which said vapors and gases pass in a horizontal direction. While thus passing horizontally through the said tubes or brick checker work the hot hydrocarbon vapors from the furnace A are mingled with the ascending water gas generated in the chamber B and by contact with the intensely heated tiles the said gases become fixed before passing off through the pipe $g$ to a scrubber or to a suitable receptacle. With this form of apparatus the blast usually employed in the process of gas making is dispensed with and by reason of the location and arrangement of the gas fixing surfaces or tiles, adjacent to the fire, they can be heated intensely in much less than the length of time ordinarily required for such purposes.

Having thus described my invention what I claim is:—

1. In a gas making apparatus, the combination of the hydrocarbon generator A, the water gas generator B, the pipe $d$ connecting the upper portions of said generators and arranged to conduct hot hydrocarbon vapors and gases from the hydrocarbon vapor generator into the water gas generator, a series of spaced apart tiles C supported in the upper part of the water gas generator opposite the end of the connecting pipe $d$ and arranged for the horizontal passage of the hot hydrocarbon vapors and gases in contact with ascending currents of water gas whereby the water gas is carbureted and fixed, and a gas outlet pipe $g$ leading from the upper part of the water gas generator opposite the pipe $d$ that connects the generators, substantially as described.

2. In a gas making apparatus, the combination of the hydrocarbon vapor generator A, the water gas generator B, the pipe $d$ connecting the upper portions of said generators, the spaced apart tiles or tile-sections C supported in the upper part of the water gas generator opposite the end of the connecting pipe $d$ and having perforations for the passage of gas in a horizontal direction from the pipe $d$, and the gas outlet pipe $g$ leading from the upper part of the water gas generator, substantially as described.

3. In a gas making apparatus, the combination of the hydrocarbon vapor generator A, the water gas generator B having the outlet $f$ in its top and the outlet pipe $g$ leading from the upper part of said generator on one side, the pipe $d$ connecting the upper portions of said generators and arranged to conduct hot hydrocarbon vapors and gases from the hydrocarbon vapor generator into the water gas generator, and a series of spaced apart perforated tiles or tile sections C supported in the upper part of the water gas generator and reduced or cut away opposite the end of the pipe $d$ and opposite the outlet $f$, substantially as described.

In testimony whereof I have hereunto set my hand and affixed my seal in presence of two subscribing witnesses.

JOSEPH ASKINS. [L. S.]

Witnesses:
JNO. D. FOYE,
M. L. BECKER.